United States Patent
Lu et al.

(10) Patent No.: US 11,919,772 B2
(45) Date of Patent: Mar. 5, 2024

(54) HETEROATOM DOPED POLYMER NANOSPHERES/CARBON NANOSPHERES AND PREPARATION METHOD THEREOF

(71) Applicant: DALIAN UNIVERSITY OF TECHNOLOGY, Liaoning (CN)

(72) Inventors: Rongwen Lu, Liaoning (CN); Minghui Liu, Liaoning (CN); Yingcen Liu, Liaoning (CN); Hua Lin, Liaoning (CN); Caicheng Song, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 382 days.

(21) Appl. No.: 17/265,199

(22) PCT Filed: Jul. 5, 2019

(86) PCT No.: PCT/CN2019/094807
§ 371 (c)(1),
(2) Date: Feb. 1, 2021

(87) PCT Pub. No.: WO2020/024766
PCT Pub. Date: Feb. 6, 2020

(65) Prior Publication Data
US 2021/0253428 A1   Aug. 19, 2021

(30) Foreign Application Priority Data

Jul. 31, 2018 (CN) .......................... 201810857851.6
Jul. 31, 2018 (CN) .......................... 201810858599.0

(51) Int. Cl.
| | | |
|---|---|---|
| C08G 14/02 | (2006.01) | |
| C01B 32/05 | (2017.01) | |
| C01B 32/15 | (2017.01) | |

(52) U.S. Cl.
CPC .............. *C01B 32/15* (2017.08); *C01B 32/05* (2017.08); *C08G 14/02* (2013.01); *C01P 2004/03* (2013.01); *C01P 2004/04* (2013.01); *C01P 2004/61* (2013.01); *C01P 2004/62* (2013.01); *C01P 2004/64* (2013.01)

(58) Field of Classification Search
CPC ....... C01B 32/15; C01B 32/05; C01B 21/086; C08G 14/02; C08G 12/08; C08G 12/32; C01P 2004/03; C01P 2004/04; C01P 2004/61; C01P 2004/62; C01P 2004/64; B01J 13/14
USPC ........................................... 523/200
See application file for complete search history.

(56) References Cited

U.S. PATENT DOCUMENTS

2010/0092370 A1   4/2010   Zhang et al.

FOREIGN PATENT DOCUMENTS

| CN | 104772088 A | 7/2015 |
| CN | 106654278 A | 5/2017 |
| CN | 108822274 A | 11/2018 |
| CN | 108862240 A | 11/2018 |

OTHER PUBLICATIONS

English Translation of CN 108862240 (Year: 2018).*
English Translation of CN 108822274 (Year: 2018).*

* cited by examiner

*Primary Examiner* — Hannah J Pak
(74) *Attorney, Agent, or Firm* — NKL Law; Allen Xue

(57) ABSTRACT

A method to make heteroatom doped polymer nanosphere/carbon nanospheres uses aromatic amine and aldehyde as raw materials, and in the presence of a compound represented by formula I, reacts the aldehyde with the compound represented by formula Ito form a Schiff base, and then reacts the aromatic amine with the resulting Schiff base, wherein the reaction is conducted in an aqueous solution system at a mild reaction temperature (10° C. to 50° C.) under stirring. The resulting polymer nanospheres are subject to centrifugation and drying, followed by calcination in an inert atmosphere to obtain carbon nanospheres. The nanospheres product prepared using the method has controllable dimensions and morphology, an even particle size, and homogeneously doped heteroatoms.

12 Claims, 13 Drawing Sheets

HETEROATOM DOPED POLYMER NANOSPHERES/CARBON NANOSPHERES AND PREPARATION METHOD THEREOF

TECHNICAL FIELD

The present disclosure belongs to the technical field of nanometer new material technology, in particular to a heteroatom doped polymer nanosphere/carbon nanosphere and preparation method thereof.

BACKGROUND ART

Heteroatom doped polymer nanospheres have great potential in adsorption and separation of carbon dioxide, labeling and detection, inflaming retarding, metal ion removal in water, storage and separation of gas, synthesises of hollow nanospheres and porous nanomaterials by hard template method, etc., which has attracted wide attention in recent years. Doping nonmetallic heteroatoms (such as sulfur, nitrogen, boron, phosphorus or polyheteroatoms) on the carbon atom skeleton can effectively improve its application performance, for example, nitrogen-doped polymer nanospheres have better adsorption performance for carbon dioxide. But at present, the research on nonmetallic heteroatom doped mainly focuses on a single nonmetallic heteroatom doped, such as the preparation of nitrogen-doped carbon nanospheres from melamine; doping with two or more kinds of heteroatoms is less involved; even if involved, heteroatom containing amino acid is used as one of the raw materials for the synthesis of heteroatom doped polymer nanomaterials under hydrothermal conditions, which is complicated, time-consuming and energy-consuming.

Heteroatom doped carbon nanospheres have great potential in conversion and storage of energy, adsorption and separation of carbon dioxide, metal ion removal in water, storage and separation of gas, and catalysis, etc. Doping nonmetallic heteroatoms (such as sulfur, nitrogen, boron, phosphorus or polyheteroatoms) on the carbon atom skeleton can effectively improve its application performance; for example, it has been found that sulfur-nitrogen double-doped graphene materials have better oxygen reduction performance than undoped graphene due to the synergistic effect of the heteroatoms; and the existence of heteroatoms can give carbon materials good electrical conductivity, chemical stability and catalytic properties. However, at present, the research on nonmetallic heteroatom doped mainly focuses on single nonmetallic heteroatom doped, and doping with two or more kinds of heteroatoms is less involved; even if involved, the means of multi-step synthesis and post-doped are used, for example, nitrogen-sulfur double-doped carbon materials are obtained by treating nitrogen containing carbon materials with elemental sulfur, $Na_2S$ or urea at high temperature. Moreover, due to the post-doped process, atoms doping is not uniform from the perspective of microscopic particle morphology. The preparation of heteroatom doped carbon nanomaterials under hydrothermal conditions and calcination is also complicated, time-consuming and energy-consuming.

At present, there has been a method for preparing nanospheres containing nitrogen from melamine or a mixture of melamine and resorcinol, the carbon nanospheres containing nitrogen can be obtained after further calcining the nanospheres containing nitrogen; There is also a method in which amino acid is involved in the synthesis of heteroatom doped carbon nanospheres. The specific methods include water bath heating method and hydrothermal method. Water bath heating method is firstly to prepare a prepolymer which is the product of N-hydroxymethylation of melamine and formaldehyde, and then the prepolymer is further condensed under acidic condition to prepare melamine formaldehyde resin microspheres. Hydrothermal method starting with melamine is also firstly to prepare a prepolymer, then the prepolymer is polymerized under the hydrothermal condition to obtain melamine formaldehyde resin microspheres; hydrothermal method starting with starch or glucose requires amino acid containing heteroatoms to participate in the formation of microspheres. Hydrothermal method requires higher reaction temperature and longer reaction time, and its yield is low, which is difficult to realize industrial application in large quantities. The carbon microspheres obtained by the water bath heating method only contains nitrogen, after calcination, the carbon microspheres only contains nitrogen; and the reaction temperature is high, the time is long and the operation is complicated.

SUMMARY OF THE INVENTION

The present disclosure provides a preparation method of heteroatom doped polymer nanosphere with simple processing operation, mild condition and quick reaction. The method under a condition of stirring and at a mild reaction temperature (10-50° C.), uses aromatic amine and aldehyde as raw materials to generate Schiff base in an aqueous solution and in the presence of a compound represented by formula I, then the aromatic amine and the generated Schiff base perform addition reaction to prepare heteroatom doped polymer nanospheres. According to different needs, users can calcine the polymer nanospheres in an inert gas atmosphere to prepare carbon nanospheres for use. The nanospheres prepared by the present method have controllable size and morphology, uniform particle size, large yield, and uniform heteroatom doped.

The method for preparing heteroatom doped polymer nanospheres provided in the present disclosure includes the following steps:

(1) under a condition of 10-50° C., dissolving aromatic amine and a compound represented by formula I in water to form a clarifying solution, wherein the compound represented by formula I is:

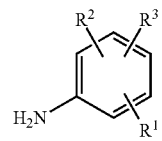

$R^1$ is selected from H and $NH_2$;
$R^2$ is selected from H, COOH, $SO_3H$, $B(OH)_2$, $OPO(OH)_2$, Cl, $OCH_3$, CN, OH, SH, and $NO_2$;
$R^3$ is selected from H and $SO_3H$;

(2) adding aqueous ammonia to the solution obtained in step (1) and stirring evenly;

(3) under the condition of 10-50° C., adding aldehyde to the solution obtained in step (2), reacting with stirring to obtain the polymer nanospheres;

Wherein, the aromatic amine in step (1) is selected from at least one of melamine, 1,3-phenylenediamine, 1,4-phenylenediamine, 1,3-xylylenediamine, 1,4-xylylenediamine, tris(4-aminophenyl)amine, 2,4,6-triaminopyrimidine, 2,6- diaminopyridine, 1,5-diaminonaphthalene, 1,4-diaminonaphthalene, 2,3-diaminonaphthalene, and 1,8-diaminonaphthalene.

For the technical solution in the present disclosure, preferably, the compounds represented by formula I in step (1) includes: 2,4-diaminobenzenesulfonic acid, orthanilic acid, metanilic acid, sulfanilic acid, m-phenylenediaminodisulfonic acid, 3,5-diaminobenzoic acid, p-aminochlorobenzene, p-aminoanisole, p-aminobenzonitrile, p-aminophenol, o-aminobenzoic acid, m-aminobenzoic acid, p-aminobenzoic acid, aniline, o-phenylenediamine, m-phenylenediamine, p-phenylenediamine, p-aminothiophenol, p-nitroaniline, o-aminophenylboronic acid, m-aminophenylboronic acid, p-aminophenylboronic acid, and p-aminophenol phosphate monoester.

For the technical solution in the present disclosure, preferably, a concentration of the compound represented by formula I in the solution of step (1) is 0.015-0.2 mol/L; a preferred concentration is 0.004-0.1 mol/L; an optimal concentration is 0.006-0.008 mol/L. When the compound represented by formula I is preferred 2,4-diaminobenzenesulfonic acid, the optimal concentration is 0.0076 mol/L.

For the technical solution in the present disclosure, preferably, the aqueous ammonia solution in step (2) is dropwise added, and a stirring time is 1-10 minutes to gradually form a clear and transparent solution.

For the technical solution in the present disclosure, preferably, the aldehyde used in step (3) includes methanal or aliphatic dialdehydes; wherein the methanal is a methanal aqueous solution product sold in the market; and the aliphatic dialdehydes include glyoxal, malondialdehyde, butanedial, glutaraldehyde, adipaldehyde, etc.

For the technical solution in the present disclosure, preferably, the aldehyde in step (3) is dropwise added, and the adding amount of the aldehyde is the aldehyde groups being 5-12 times the equivalent of aromatic amines. A preferred adding amount of the aldehyde is the aldehyde groups being 8-10 times the equivalent of aromatic amines. An optimal adding amount of the aldehyde is the aldehyde groups being 9 times the equivalent of aromatic amines.

For the technical solution in the present disclosure, preferably, stirring after adding aldehyde in step (3), the solution becomes turbid from clear as time prolongs; keeping stirring to react for 0.2-6 hours, followed by centrifuging and drying the products to obtain the polymer nanospheres with uniform particle size, controllable size and morphology, and good dispersity.

For the technical solution in the present disclosure, a preferred temperature in step (1) to (3) ranges from 20° C. to 35° C.; and the optimal temperature is 25° C.

The method in the present disclosure uses aromatic amine and aldehyde as basic raw materials, the reaction system is water; aqueous ammonia is added to adjust the pH of the reaction, which is conducive to the regulation of the uniformity and morphology of the polymer nanospheres; and the addition of compound represented by formula I is conducive to the rapid formation and the morphology control for nanospheres. The concentration of the basic raw materials, the concentration of the compound represented by formula I, and the adding amounts of aqueous ammonia in the system are mutually restricted. The particle size of the polymer nanospheres can be well regulated by changing the ratio of the compound represented by formula I to aromatic amine, the ratio of aromatic amine to aldehyde, the concentration of aromatic amine, different adding amounts of aqueous ammonia, and different reaction temperature (10-50° C.) in the system.

On the other hand, the present invention also discloses heteroatom doped polymer nanospheres prepared by the method mentioned above, with a nitrogen content of 20%-80% and a sulfur content of 0.1%-10%, and the content of which is adjustable. The diameter of nanophere is 30 nm-3 mm with uniform particle size, uniform distribution of heteroatoms, adjustable particle size and good dispersity.

The present invention discloses a preparation method of carbon nanospheres containing nitrogen and sulfur, which is to prepare by calcining the heteroatom doped polymer nanospheres prepared in the present disclosure in an inert gas atmosphere. The specific method is as follows: on the basis of the method for preparing the polymer nanospheres, the method also includes a step (4) of centrifuging and drying the polymer nanospheres, followed by calcining the products in an inert gas atmosphere to prepare heteroatom doped carbon nanospheres.

Preferably, after reacting for 0.2-6 hours, the products obtained in step (3) are centrifuged at 6000 rpm, and then washed three times (or drying directly without washing) with 20% of ethanol solution, centrifuged and dried to obtain the polymer nanospheres with uniform particle size, controllable morphology, and good dispersity.

Preferably, the calcining condition in step (4) is 300-800° C., a preferred condition is 400-600° C., a further preferred condition is 500° C.

Preferably, the calcining condition in step (4) starts from room temperature, the increase temperature rate of calcination is 2.5° C./min, keeping the temperature at 100° C. for 30 minutes, keeping the temperature of the intermediate program at a constant temperature for 60 minutes, finally, keeping the calcinating temperature for 120 minutes, and then naturally cooling.

Further, the calcining conditions used in some embodiments of the present disclosure are as follows: starting from room temperature, increasing to 100° C. at 2.5° C./min, keeping the temperature constant for 30 minutes; then increasing to 300° C. at 2.5° C./min, keeping the temperature constant for 60 minutes; then increasing to 500° C. at 2.5° C./min, keeping the temperature constant for 120 minutes, finally naturally cooling to obtain carbon nanospheres.

The nitrogen content of the carbon nanosphere containing nitrogen and sulfur in the present disclosure is 1-60%, a preferred nitrogen content is 20-60%, the sulfur content is 0.1%-8%, and the contents are adjustable. The diameter of the nanosphere ranges from 30 nm to 2 μm with uniform particle, uniform distribution of the heteroatoms, adjustable size and good dispersity.

Beneficial effects:
1. The method of the present disclosure provided a brand-new process route that can be performed in a mild operation temperature (10-50° C.), which avoids the relatively harsh temperature of 70-100° C. or hydrothermal reaction conditions used in the traditional process. The disclosed method is especially suitable for rapid operation at room temperature (20-35° C.) and more conductive to popularization and application.
2. The method provided in the present disclosure is simple, easy to operate, and has large yield. According to the use requirements, the provided method can prepare the polymer nanospheres/carbon nanospheres with controllable size and morphology by controlling the ratio of compound represented by formula I to aromatic amine, the ratio of aromatic amine to aldehyde, the concentration of aromatic amine, different adding amounts of aqueous ammonia, and different reaction temperature (10-50° C.).
3. The method provided in the present disclosure has a fast reaction, the products can be generated within a few minutes after adding aldehyde in step (3); and under the condition of stirring, the solution becomes turbid from clear as time prolongs, the products increase gradually until the end of the reaction, after all the polymer nanospheres are taken out by centrifugation, the residual reaction fluid can be recycled and reused.
4. The method provided in the present disclosure can use high carbon number aliphatic aldehyde with high carbon number, which can avoid the use of harmful substance formaldehyde.

DETAILED DESCRIPTION OF THE PREFERRED EMBODIMENTS

The following non-limiting embodiments can make those ordinary skilled in the art to understanding of the present disclosure comprehensively, but shall not limit the present disclosure in any way.

The experiment methods in the following embodiments are conventional methods unless otherwise specified; the reagents and materials are commercially available unless otherwise specified.

Embodiment 1

Figure 1:
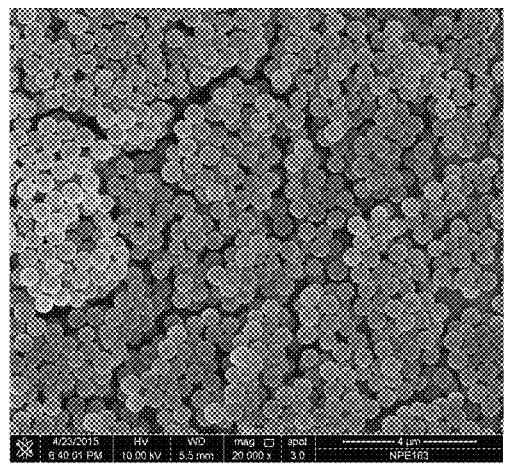
FIG. 1 is a SEM (Scanning electron microscope) diagram of the nanospheres prepared by reacting 10 g of melamine with 2,4-diaminobenzenesulfonic acid.

10 g (0.08 mol) melamine and 3.01 g (0.016 mol) 2,4-diaminobenzenesulfonic acid were dissolved in 2000 mL water, 5 mL aqueous ammonia was dropwise added, and the solution was stirred with rotate speed of 500 rpm at the temperature of 25° C. until uniform and transparent; then 50 mL methanal aqueous solution was added, after about 3 minutes, the liquid appeared visibly turbid; keeing 25° C., the solution was stirred at 500 rpm for 2 hours, the product were centrifuged, washed, and dried, then observed by electron microscopy. As shown in FIG. 1, the nanospheres were uniform with an average particle size of 512 nm.

Embodiment 2

Figure 2:
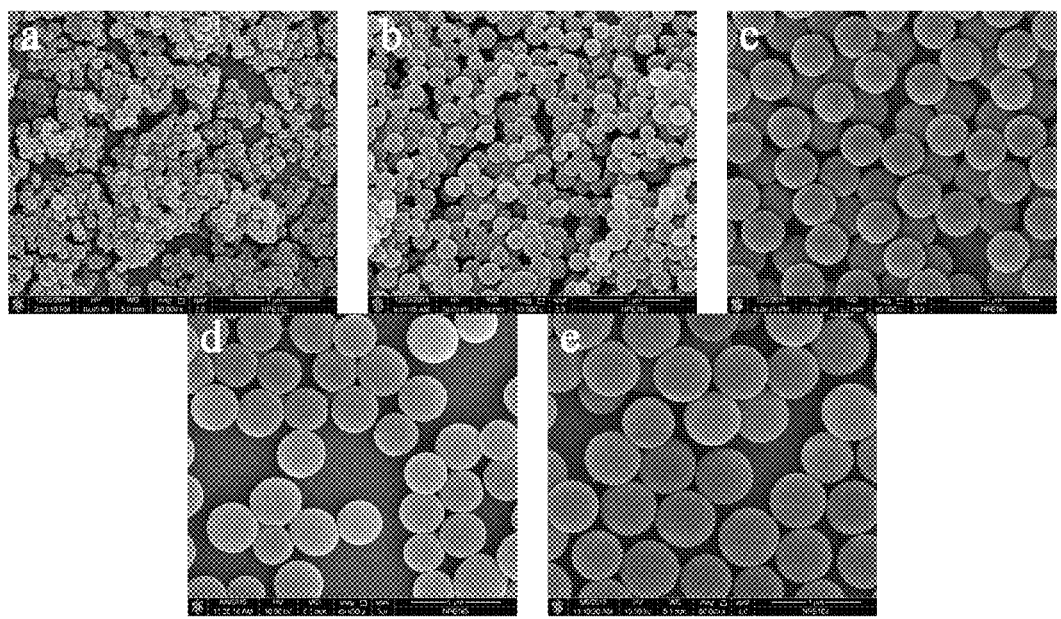
FIG. 2 is a SEM diagram of the nanospheres prepared by reaction involving 2,4-diaminobenzenesulfonic acid at different temperatures.

0.19 g (0.0015 mol) melamine and 0.058 g (0.0003 mol) 2,4-diaminobenzenesulfonic acid were dissolved in 50 mL water, 0.1 mL aqueous ammonia was dropwise added, and the solution was stirred with rotate speed of 500 rpm at the temperatures of 5° C., 15° C., 25° C., 35° C. and 45° C. respectively until uniform and transparent; 1.2 mL methanal aqueous solution was added respectively, after about 45 seconds, the solutions became turbid from clear; keeping the temperature, the solution was stirred at 500 rpm for 2 hours; after the reactions were completed, the products were centrifuged, washed, and dried to obtain polymer nanospheres containing nitrogen and sulfur, and observed by electron microscopy. As shown in FIG. 2, the temperature conditions in FIG. 2a to FIG. 2e were 5° C., 15° C., 25° C., 35° C. and 45° C. successively, and the nanospheres were uniform with each average particle size of 148 nm, 257 nm, 513 nm, 627 nm and 845 nm.

Figure 3:
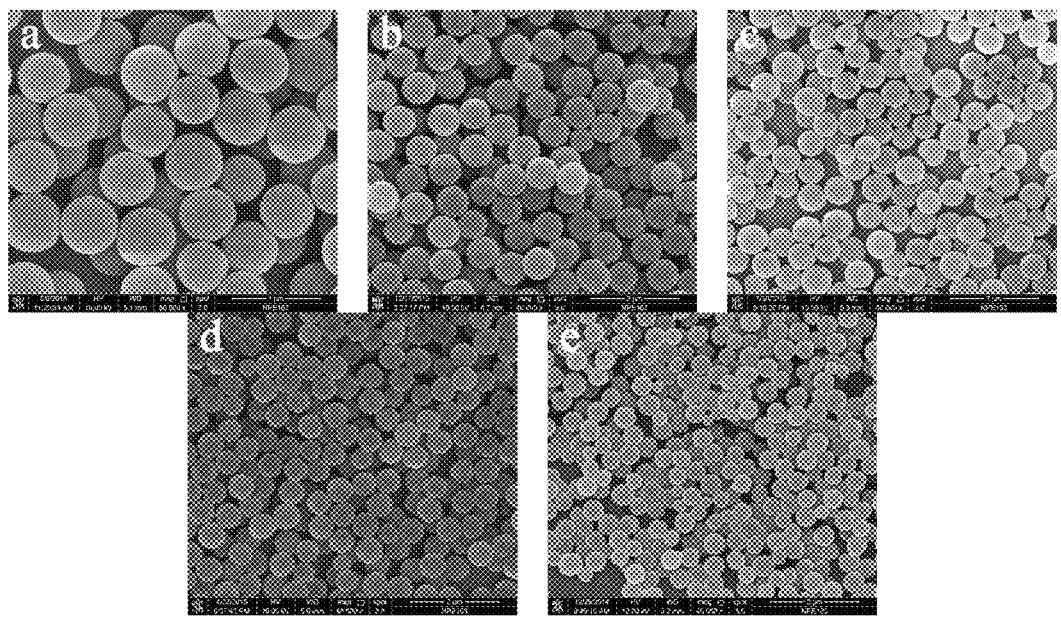
FIG. 3 is a SEM diagram of the nanospheres prepared by reaction involving 2,4-diaminobenzenesulfonic acid with different concentrations.

Embodiment 3 melamine of 0.19 g (0.0015 mol) and 2,4-diaminobenzenesulfonic acid respectively of 0.0145 g (0.000075 mol), 0.029 g (0.00015 mol), 0.058 g (0.0003 mol), 0.116 g (0.0006 mol), 0.174 g (0.0009 mol) were dissolved in 50 mL water, 0.1 mL aqueous ammonia was dropwise added, and the solutions were stirred with rotate speed of 500 rpm at the temperature of 25° C. until uniform and transparent; 1.2 mL methanal aqueous solution was added respectively, after about 45 seconds, the solutions became turbid from clear; keeping 25° C., the solutions were stirred at 500 rpm for 2 hours. After the reactions were completed, the products were centrifuged, washed, and dried to obtain polymer nanospheres containing nitrogen and sulfur, and observed by electron microscopy. As shown in FIG. 3, the amounts of 2,4-diaminobenzenesulfonic acid in FIG. 3a to FIG. 3e were 0.0145 g (0.000075 mol), 0.029 g (0.00015 mol), 0.058 g (0.0003 mol), 0.116 g (0.0006 mol), 0.174 g (0.0009 mol) successively, and the nanospheres were uniform with each average particle size of 793 nm, 624 nm, 496 nm, 307 nm and 169 nm.

Embodiment 4

Figure 4:
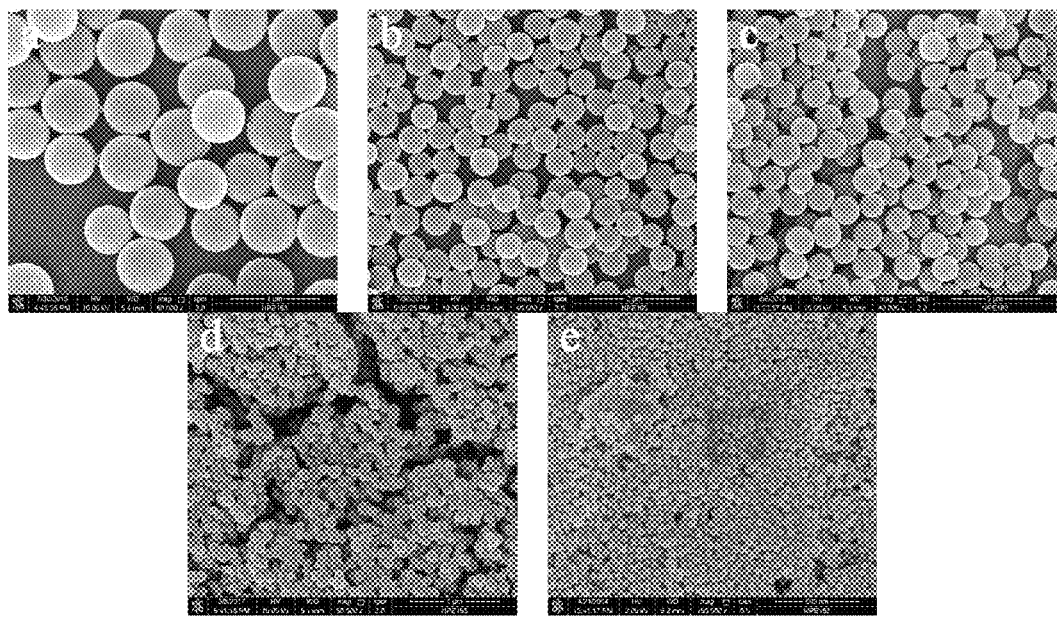
FIG. 4 is a SEM diagram of the nanospheres prepared by 2,4-diaminobenzenesulfonic acid involved reaction with different amounts of melamine.

0.1 g (0.0008 mol), 0.0125 g (0.001 mol), 0.25 g (0.002 mol), 0.33 g (0.0026 mol), 0.5 g (0.004 mol) melamine and 0.058 g (0.0003 mol) 2,4-diaminobenzenesulfonic acid were dissolved in 50 mL water, 0.1 mL aqueous ammonia was dropwise added, and the solutions were stirred with rotate speed of 500 rpm at temperature of 25° C. until uniform and transparent; 1.2 mL methanal aqueous solution was added respectively, after about 45 seconds, the solutions became turbid from clear; keeping 25° C., the solutions were stirred at 500 rpm for 2 hours. After the reactions were completed, the products were centrifuged, washed, and dried to obtain polymer nanospheres containing nitrogen and sulfur, and observed by electron microscopy. As shown in FIG. 4, the amount of melamine in FIG. 4a to FIG. 4e were 1 g (0.0008 mol), 0.0125 g (0.001 mol), 0.25 g (0.002 mol), 0.33 g (0.0026 mol), 0.5 g (0.004 mol) successively, and the nanospheres were uniform with each average particle size of 753 nm, 607 nm, 531 nm, 130 nm and 70 nm.

Embodiment 5

Figure 5:
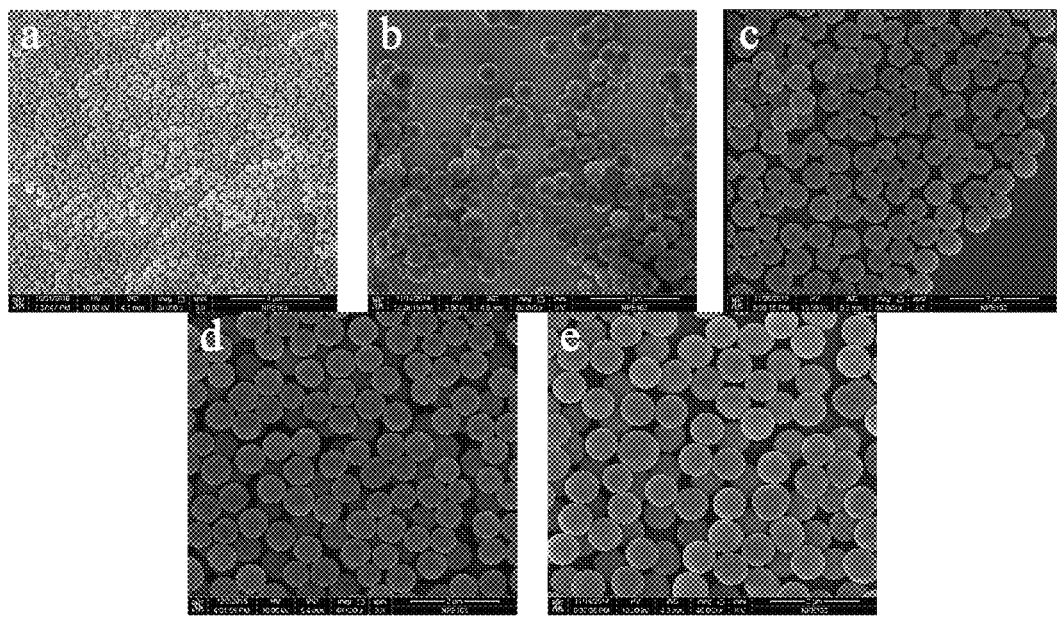
FIG. 5 is a SEM diagram of the nanospheres prepared by 2,4-diaminobenzenesulfonic acid involved reaction with different amounts of aqueous ammonia.

0.19 g (0.0015 mol) melamine and 0.058 g (0.0003 mol) 2, 4-diaminobenzene sulfonic acid were dissolved in 50 mL water, 0.01 mL, 0.05 mL, 0.1 mL, 0.2 mL and 0.3 mL aqueous ammonia were respectively dropwise added, the solutions were stirred with the rotate speed of 500 rpm at the temperature of 25° C. until uniform and transparent; 1.2 mL methanal aqueous solution was added respectively, after about 45 seconds, the solutions became turbid from clear; keep 25° C., the solutions were stirred at 500 rpm for 2 hours. After the reactions were completed, the products were centrifuged, washed, and dried to obtain polymer nanospheres containing nitrogen and sulfur, and observed by electron microscopy. As shown in FIG. 5, the amounts of aqueous ammonia in FIG. 5a to FIG. 5e were 0.01 mL, 0.05 mL, 0.1 mL, 0.2 mL and 0.3 mL successively, and the nanospheres were uniform with each average particle size of 163 nm, 203 nm, 537 nm, 607nm and 715 nm.

Embodiment 6

Figure 6:
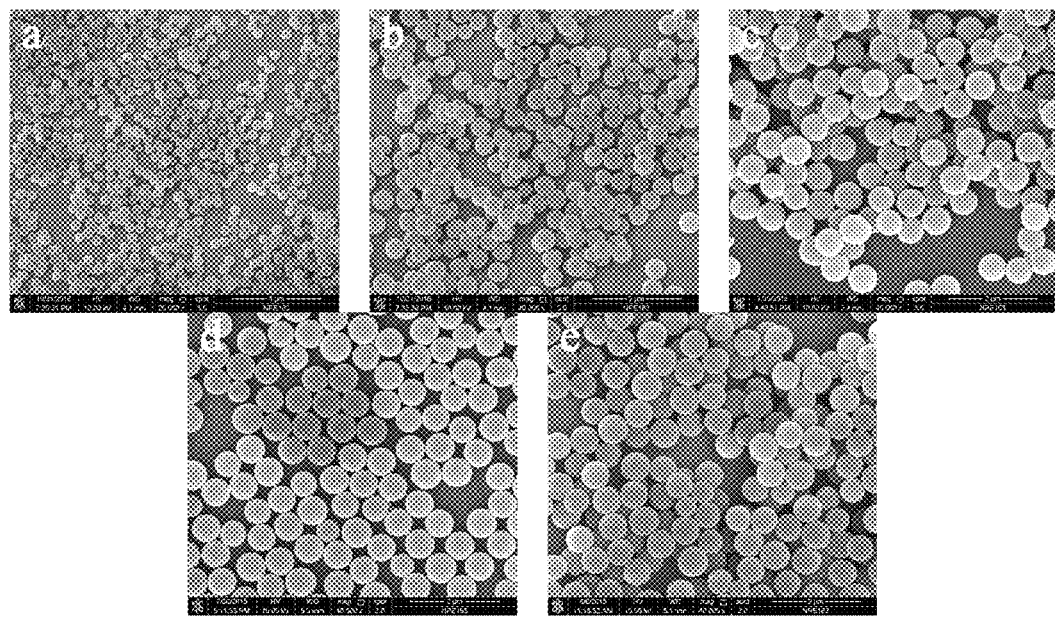
FIG. 6 is a SEM diagram of the nanospheres prepared by 2,4-diaminobenzenesulfonic acid involved reaction with different amounts of methanal.

0.19 g (0.0015 mol) melamine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 0.337 mL, 0.5 mL, 0.675 mL, 1 mL and 1.35 mL methanal aqueous solutions were respectively added, after about 45 seconds, the solutions became turbid from clear; keep 25° C., the solutions were stirred at 500 rpm for 2 hours. After the reactions were completed, the products were centrifuged, washed, and dried to obtain polymer nanospheres containing nitrogen and sulfur, and observed by electron microscopy. As shown in FIG. 6, the amounts of formaldehyde in FIG. 6a to FIG. 6e were 0.337 mL, 0.5mL, 0.675 mL, 1 mL and 1.35 mL successively, and the nanospheres were uniform with each average particle size of 245 nm, 470 nm, 600 nm, 624nm and 624 nm.

Embodiment 7

Figure 7:
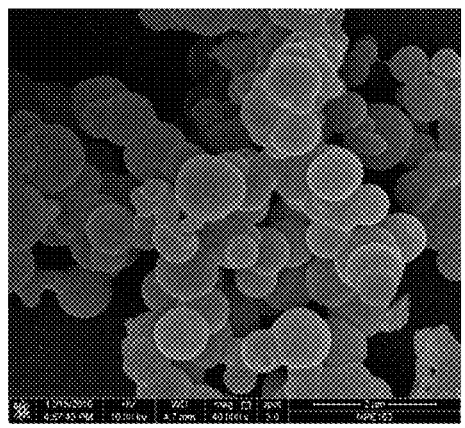
FIG. 7 is a SEM diagram of the nanospheres prepared by orthanilic acid involved reaction.

0.19 g (0.0015 mol) melamine and 0.0519 g (0.0003 mol) orthanilic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 7 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 7, the average particle size of the nanospheres was 912 nm.

Embodiment 8

Figure 8:
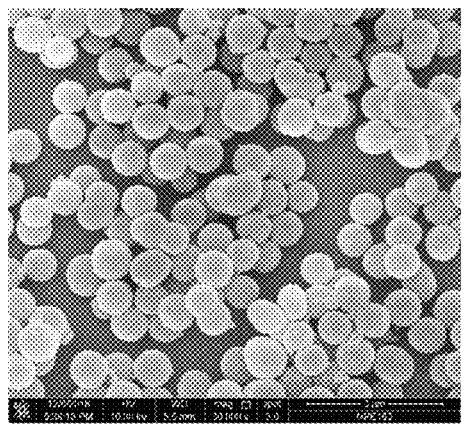
FIG. 8 is a SEM diagram of the nanospheres prepared by metanilic acid involved reaction.

0.19 g (0.0015 mol) melamine and 0.0519 g (0.0003 mol) metanilic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 5 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 8, the nanospheres were uniform with an average particle size of 800 nm.

Embodiment 9

Figure 9:
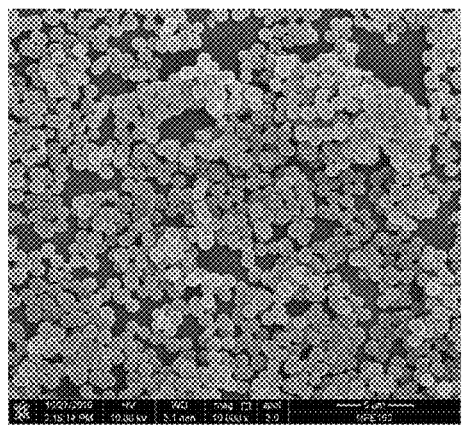
FIG. 9 is a SEM diagram of the nanospheres prepared by sulfanilic acid involved reaction.

0.19 g (0.0015 mol) melamine and 0.0519 g (0.0003 mol) sulfonilic acid were dissolved in 50 mL water, 0.1 mL aqueous ammonia was dropwsie added, and the solution was stirred with the rotate speed of 500 rpm at the temperature of 25° C. until uniform and transparent; 1.2 mL methanal aqueous solution was added, after about 6 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 9, the nanospheres were uniform with an average particle size of 867 nm.

Embodiment 10

Figure 10:
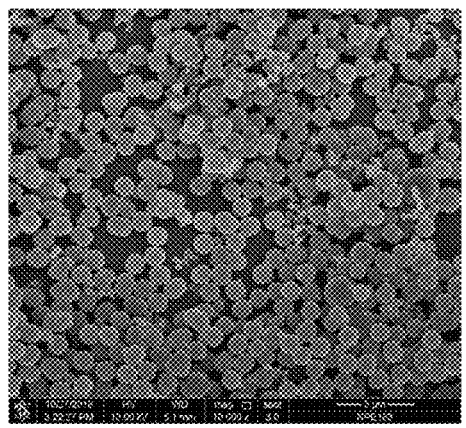
FIG. 10 is a SEM diagram of the nanospheres prepared by p-aminochlorobenzene involved reaction.

0.19 g (0.0015 mol) melamine and 0.0381 g (0.0003 mol) p-aminochlorobenzene were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 10 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 10, the average particle size of the nanospheres was 1376 nm.

Embodiment 11

Figure 11:
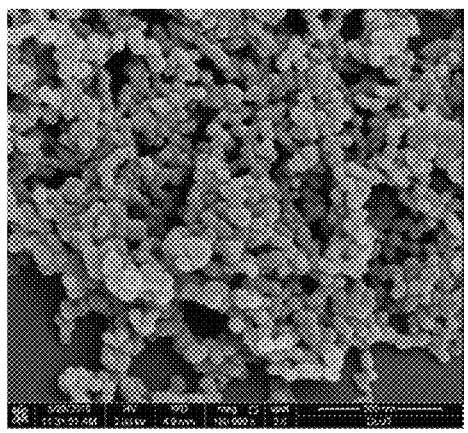
FIG. 11 is a SEM diagram of the nanospheres prepared by melamine, m-phenylenediamine and m-phenylenediaminodisulfonic acid involved reaction.

A total of 0.001 mol mixture of melamine and m-phenylenediamine with equal molar ratio and 0.0003 mol m-phenylenediaminodisulfonic acid were dissolved in 50 mL water, 0.1 mL aqueous ammonia was dropwise added, and the solution was stirred with the rotate speed of 500 rpm at the temperature of 25° C. until uniform and transparent; 1.5 mL methanal aqueous solution was added, after about 2 minutes, the solution appeared visibly turbid; keeping 25° C., the solution was stirred at 500 rpm for 4 hours. After the reaction was completed, the product was centrifuged, washed, and dried, then observed by electron microscopy as shown in FIG. 11.

Embodiment 12

Figure 12:
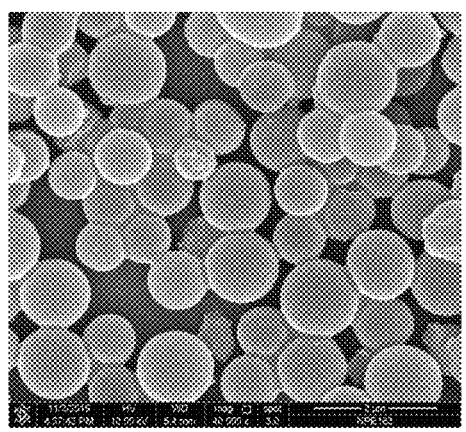
FIG. 12 is a SEM diagram of the nanospheres prepared by p-aminoanisole involved reaction.

0.19 g (0.0015 mol) melamine and 0.0371 g (0.0003 mol) p-aminoanisole were dissolved in 50 mL water, 0.1 mL aqueous ammonia was dropwise added, and the solution was stirred with the rotate speed of 500 rpm at the temperature of 25° C. until evenly dispersed; 1.2 mL methanal aqueous solution was added, after about 7 minutes, the solution appeared visibly turbid.; keeping 25° C., the solution was stirred at 500 rpm for 6 hours. After the reaction was completed, the product was centrifuged, washed, and dried to obtain polymer nanospheres containing nitrogen and sulfur, and then observed by electron microscopy as shown in FIG. 12.

Embodiment 13

Figure 13:
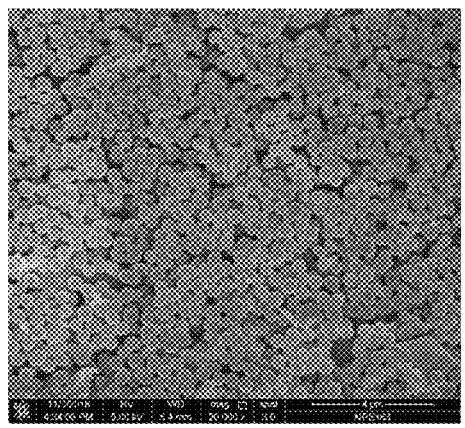
FIG. 13 is a SEM diagram of the nanospheres prepared by p-aminobenzonitrile involved reaction.

0.19 g (0.0015 mol) melamine and 0.0354 g (0.0003 mol) p-aminobenzonitrile were dissolved in 50 mL water, 0.1 mL aqueous ammonia was dropwise added, and the solution was stirred with the rotate speed of 500rpm at the temperature of 25° C. until uniform and transparent; 1.2 mL methanal aqueous solution was added, after about 7 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 13, the nanospheres were uniform with an average particle size of 1071 nm.

Embodiment 14

Figure 14:
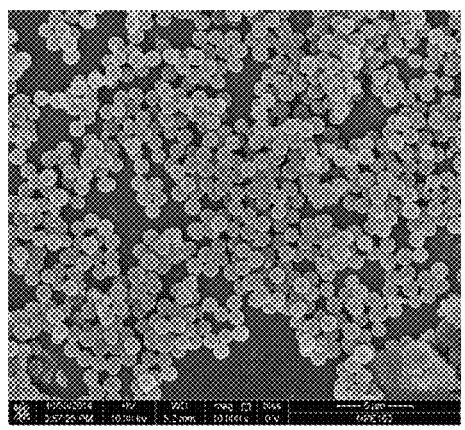
FIG. 14 is a SEM diagram of the nanospheres prepared by p-aminophenol involved reaction.

0.19 g (0.0015 mol) melamine and 0.0328 g (0.0003 mol) p-aminophenol were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 2 minutes, the solution appeared visibly turbid. keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 14, the nanospheres were uniform with an average particle size of 466 nm.

Embodiment 15

Figure 15:
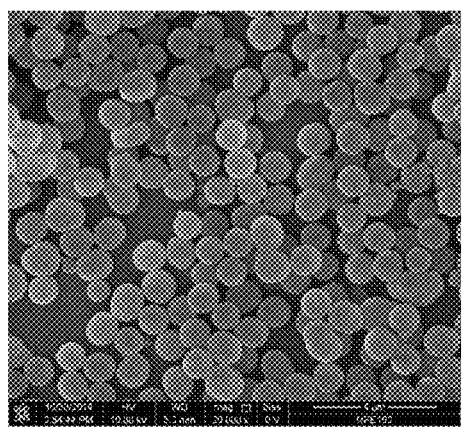
FIG. 15 is a SEM diagram of the nanospheres prepared by o-aminobenzoic acid involved reaction.

0.19 g (0.0015 mol) melamine and 0.0411 g (0.0003 mol) o-aminobenzoic acid were dissolved in 50 mL water, 0.1 mL aqueous ammonia was dropwise added, and the solution was stirred with the rotate speed of 500 rpm at the temperature of 25° C. until evenly dispersed; 1.2 mL methanal aqueous solution was added, after about 6 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 15, the nanospheres were uniform with an average particle size of 1015 nm.

Embodiment 16

Figure 16:
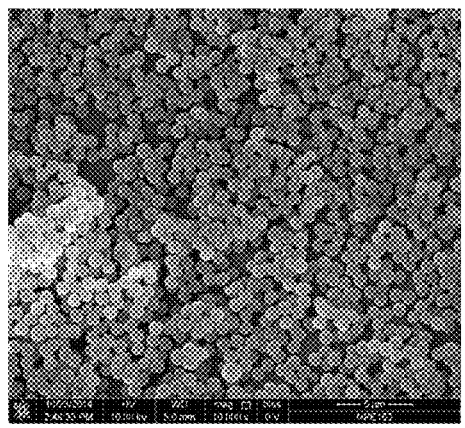
FIG. 16 is a SEM diagram of the nanospheres prepared by m-aminobenzoic acid involved reaction.

0.19 g (0.0015 mol) melamine and 0.0411 g (0.0003 mol) m-aminobenzoic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 5 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 16, the nanospheres were uniform with an average particle size of 1003 nm.

Embodiment 17

Figure 17:
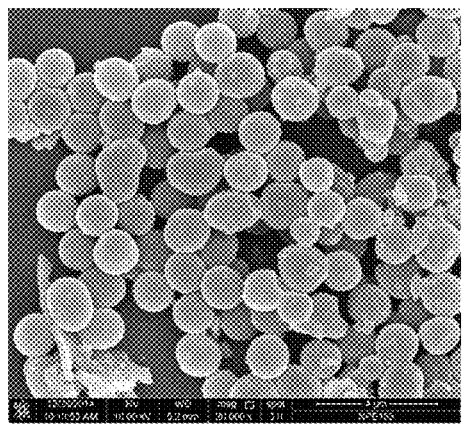
FIG. 17 is a SEM diagram of the nanospheres prepared by p-aminobenzoic acid involved reaction.

0.19 g (0.0015 mol) melamine and 0.0411 g (0.0003 mol) p-aminobenzoic acid were dissolved in 50 mL water, 0.1 mL aqueous ammonia was dropwise added, and the solution was stirred with the rotate speed of 500rpm at the temperature of 25° C. until uniform and transparent; 1.2 mL methanal aqueous solution was added, after about 6 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy, As shown in FIG. 17, the average particle size of the nanospheres was 862 nm.

Embodiment 18

Figure 18:
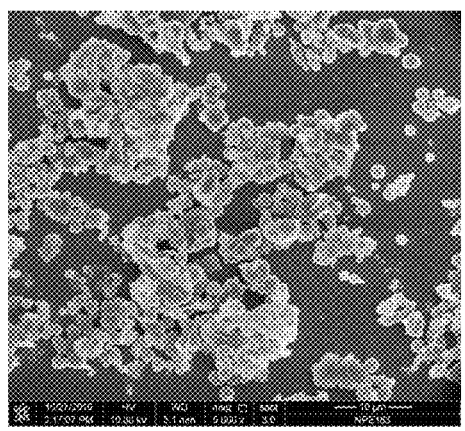
FIG. 18 is a SEM diagram of the nanospheres prepared by aniline involved reaction.

0.19 g (0.0015 mol) melamine and 0.0281 g (0.0003 mol) aniline were dissolved in 50 mL water, 0.1 mL aqueous ammonia was dropwise added, and the solution was stirred with the rotate speed of 500 rpm at the temperature of 25° C. until uniform and transparent; 1.2 mL methanol aqueous solution was added, after about 20 minutes, the solution appeared visibly turbid; keeping 25° C., the solution was stirred at 500 rpm for 6 hours. After the reaction was completed, the product was centrifuged, washed, and dried to obtain polymer nanospheres containing nitrogen and sulfur, and then observed by electron microscopy. As shown in FIG. 18, the average particle size of the nanospheres was 1377 nm.

Embodiment 19

Figure 19:
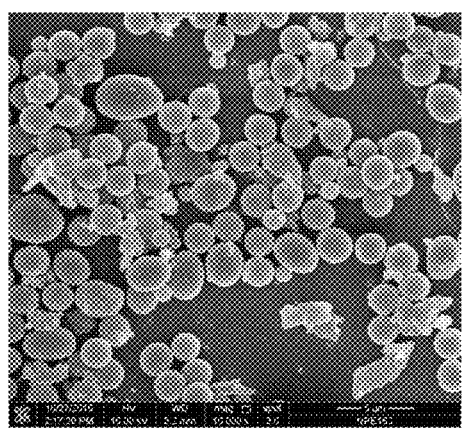
FIG. 19 is a SEM diagram of the nanospheres prepared by o-phenylenediamine involved reaction.

0.19 g (0.0015 mol) melamine and 0.0324 g (0.0003 mol) o-phenylenediamine were dissolved in 50 mL water, 0.1 mL aqueous ammonia was dropwise added, and the solution was stirred with the rotate speed of 500rpm at the temperature of 25° C. until uniform and transparent; 1.2 mL methanal aqueous solution was added, after about 9 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 19, the average particle size of the nanospheres was 1546 nm.

Embodiment 20

Figure 20:
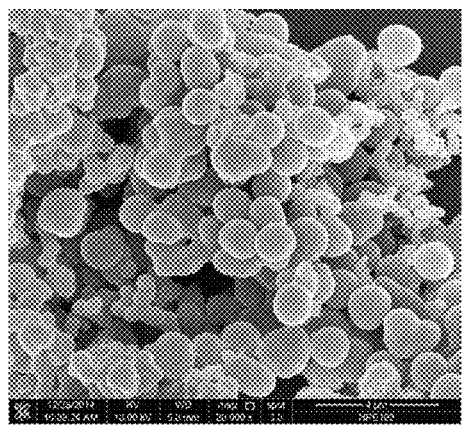
FIG. 20 is a SEM diagram of the nanospheres prepared by m-phenylenediamine involved reaction.

0.19 g (0.0015 mol) melamine and 0.0324 g (0.0003 mol) m-phenylenediamine were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 7 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 20, the average particle size of the nanospheres was 2078 nm.

Embodiment 21

Figure 21:
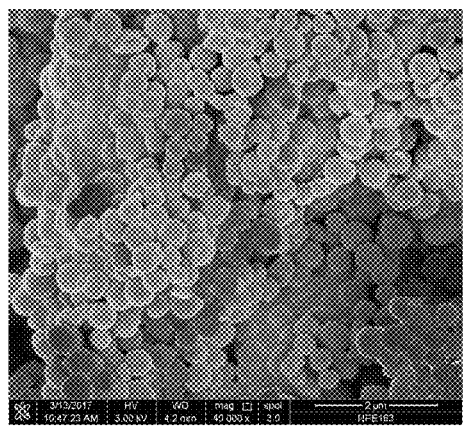
FIG. 21 is a SEM diagram of the nanospheres prepared by p-phenylenediamine involved reaction.

0.19 g (0.0015 mol) melamine and 0.0324 g (0.0003 mol) p-phenylenediamine were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 10 minutes, the solution appeared visibly turbid; keeping 25° C., the solution was stirred at 500 rpm for 4 hours. After the reaction was completed, the product was centrifuged, washed, and dried, then observed by electron microscopy. As shown in FIG. 21, the average particle size of the nanospheres was 1355 nm.

Embodiment 22

Figure 22:
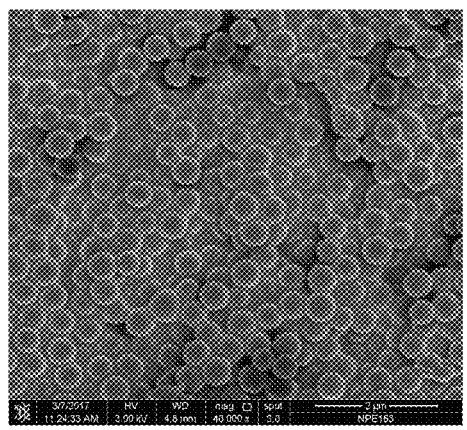
FIG. 22 is a SEM diagram of the nanospheres prepared by 2,4-diaminobenzenesulfonic acid involved reaction.

0.294 g (0.0015 mol) 1,2,6-triphenylamine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 10 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy, as shown in FIG. 22.

Embodiment 23

Figure 23:
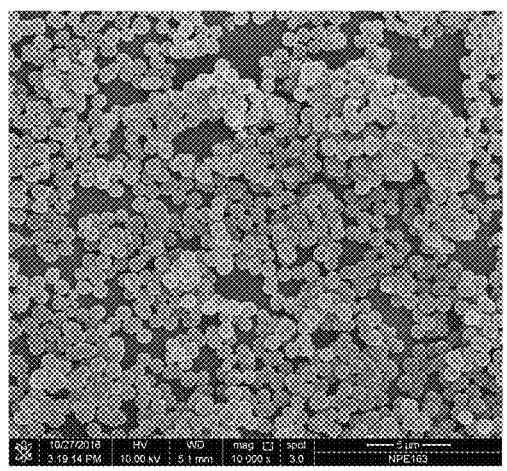
FIG. 23 is a SEM diagram of the nanospheres prepared by 4-aminobenzboric acid involved reaction.

0.19 g (0.0015 mol) melamine and 0.011 g (0.0003 mol) 4-aminophenylboronic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 4.25 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 23, the nanospheres were uniform with an average particle size of 543 nm.

Embodiment 24

Figure 24:
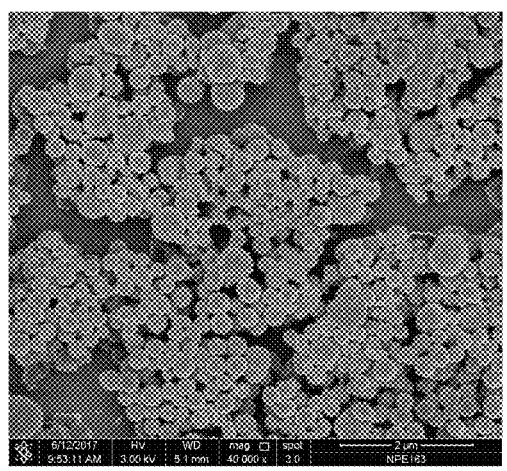
FIG. 24 is a SEM diagram of the nanospheres prepared by 2,4-diaminobenzonic acid involved reaction using glyoxal as a raw material.

0.19 g (0.0015 mol) melamine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 1 mL glyoxal aqueous solution was added, after about 20 hours, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 24, the average particle size of the nanospheres was 440 nm.

Embodiment 25

Figure 25:
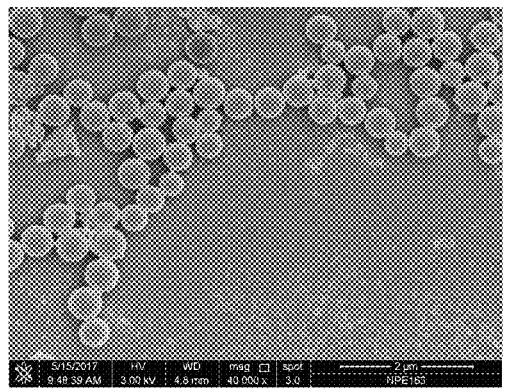
FIG. 25 is a SEM diagram of the nanospheres prepared by 2,4-diaminobenzonic acid involved reaction using glutaraldehyde as a raw material to prepare nanospheres.

0.19 g (0.0015 mol) melamine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 1.4 mL glutaraldehyde aqueous solution was added, after about 10 minutes, the solution appeared visibly turbid; keeping 25° C., the solution was stirred at 500 rpm for 4 hours. After the reaction was completed, the product was centrifuged, washed, and dried to obtain polymer nanospheres containing nitrogen and sulfur, and then observed by electron microscopy. As shown in FIG. 25, the average particle size of the nanospheres was 400 nm.

Embodiment 26

Figure 26:
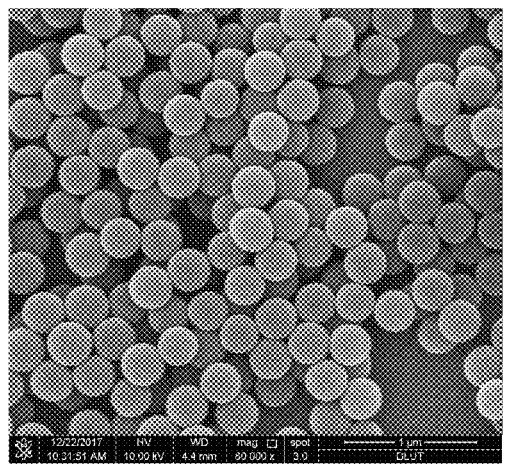
FIG. 26 is a SEM diagram of the nanospheres prepared by using 2,4,6-triaminopyrimidine, 2,4-diaminobenzenesulfonic acid and methanal as raw materials.

0.19 g (0.0015 mol) 2,4,6-triaminopyrimidine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 7 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 26, the nanospheres were uniform with an average particle size of 243 nm.

Embodiment 27

Figure 27:
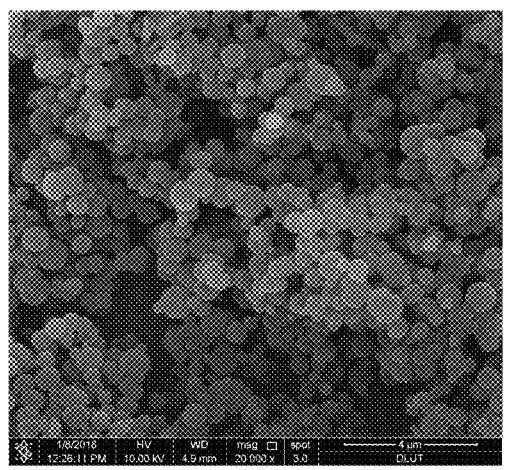
FIG. 27 is a SEM diagram of the nanospheres prepared by using 2,6-diaminopyridine, 2,4-diaminobenzenesulfonic acid and methanal as raw materials.

0.16 g (0.0015 mol) 2,6-diaminopyridine and 0.058 g (0.0003 mol) 2,4-diaminobenzenesulfonic acid were dissolved in 50 mL water, 0.1 mL aqueous ammonia was dropwise added, the solution was stirred with the rotate speed of 500 rpm at the temperature of 25° C. until uniform and transparent; 1.2 mL methanal aqueous solution was added, after about 7 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy, as shown in FIG. 27.

Embodiment 28

Figure 28:
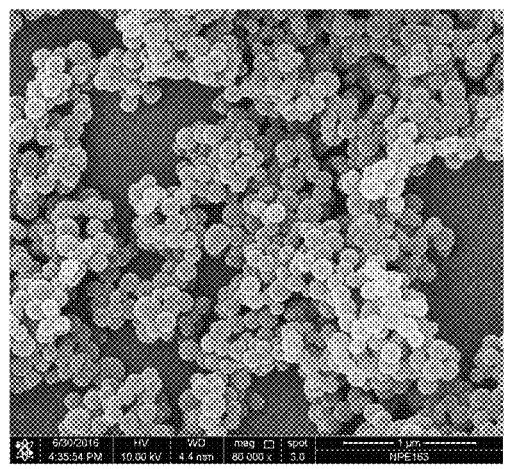
FIG. 28 is a SEM diagram of the nanospheres prepared by using 1,5-diaminaphthalene, 2,4-diaminobenzenesulfonic acid and methanal as raw materials.

0.24 g (0.0015 mol) 1,5-diaminonaphthalene and 0.058 g (0.0003 mol) 2,4-diaminobenzenesulfonic acid were dissolved in 50 mL water, 0.1 mL aqueous ammoniawas dropwise added, and the solution was stirred with the rotate speed of 500 rpm at the temperature of 25° C. until uniform and transparent; 1.2 mL methanal aqueous solution was added, after about 7 minutes, the solution appeared visibly turbid; keeping 25° C., the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 28, the nanospheres were uniform with an average particle size of 106 nm.

Embodiment 29

Figure 29:
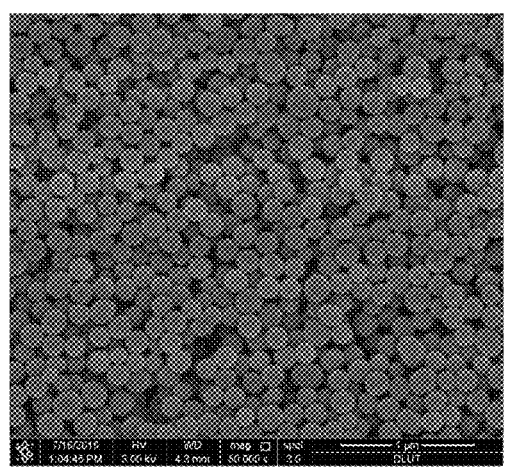
FIG. 29 is a SEM diagram of the nanospheres prepared by reaction involving 3.78 g of m-phenylenediamine and 2,4-diaminobenzenesulfonic acid.

3.78 g (0.0035 mol) m-phenylenediamine and 0.58 g (0.003 mol) 2,4-diaminobenzenesulfonic acid were dissolved in 500 mL water, 0.5 mL aqueous ammonia was dropwise added, and the solution was stirred with the rotate speed of 500 rpm at the temperature of 25° C. until uniform and transparent; 12 mL methanal aqueous solution was added, after about 2 seconds, the 1 solution appeared visibly turbid; keeping the temperature, the solution was stirred at 500 rpm for 2 hours. After the reaction was completed, the product was centrifuged, washed, and dried to obtain polymer nanospheres containing nitrogen and sulfur, and then observed by electron microscopy. As shown in FIG. 29, the nanospheres were uniform with an average particle size of 172 nm.

Embodiment 30

Figure 30:
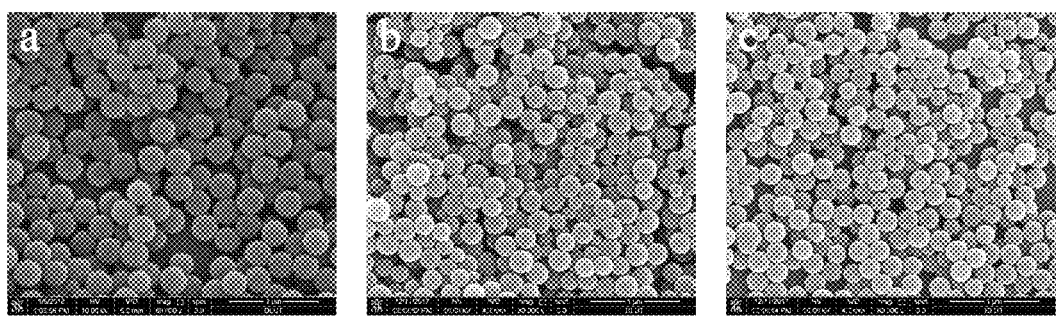
FIG. 30 is a SEM diagram of the nanospheres prepared by 2,4-diaminobenzenesulfonic acid involved reaction with different amounts of m-phenylenediamine.

0.378 g (0.0035 mol), 0.351 g(0.00325 mol) and 0.324 g (0.003 mol) m-phenylenediamine and 0.058 g (0.0003 mol) 2,4-diaminobenzenesulfonic acid were dissolved in 50 mL water, 0.05 mL aqueous ammonia was dropwise added, the solutions were stirred with the rotate speed of 500 rpm at the temperature of 25° C. until uniform and transparent; 1.2 mL methanal aqueous solution was added respectively, after about 2 seconds, the solutions appeared visibly turbid; keeping the temperature, the solutions were stirred at 500 rpm for 2 hours. After the reactions were completed, the products were centrifuged, washed, and dried to obtain polymer nanospheres containing nitrogen and sulfur, and then observed by electron microscopy. As shown in FIG. 30, the amounts of m-phenylenediamine in FIG. 30a to FIG. 30e were 0.378 g (0.0035 mol), 0.351 g (0.00325 mol) and 0.324 g (0.003 mol) successively, and the nanospheres were uniform with each average particle size of 353 nm, 259 nm, and 240 nm.

Embodiment 31

Figure 31:
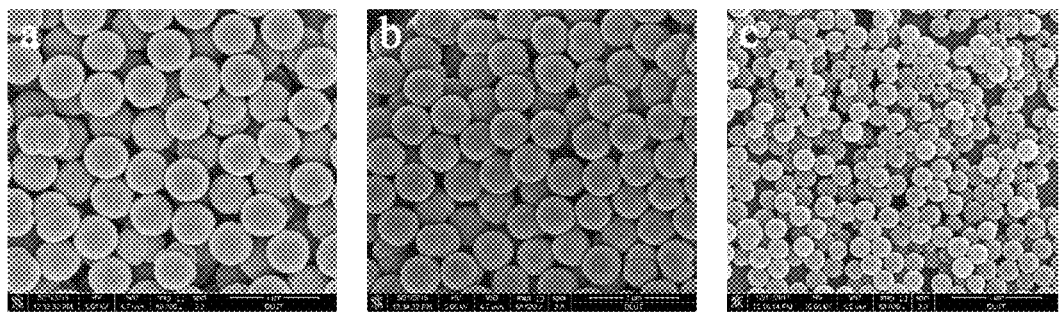
FIG. 31 is a SEM diagram of the nanospheres prepared by m-phenylenediamine and 2,4-diaminobenzene sulfonic acid involved reaction at different temperatures.

0.324 g (0.003 mol) m-phenylenediamine and 0.058 g (0.0003 mol) 2,4-diaminobenzenesulfonic acid were dissolved in 50 mL water, 0.05 mL aqueous ammonia was dropwise added, and the solution was stirred with the rotate speed of 500 rpm at the temperatures of 5° C., 15° C., 25° C. respectively until uniform and transparent; 1.2 mL methanal aqueous solution was added respectively, after about 2 seconds, the solutions became turbid from clear; keeping the temperature, the solutions were stirred at 500 rpm for 2 hours. After the reactions were completed, the product was centrifuged, washed, and dried to obtain polymer nanospheres containing nitrogen and sulfur, and then observed by electron microscopy. As shown in FIG. 31, the temperatures in FIG. 31a to FIG. 31c were 5° C., 15° C. and 25° C. successively, and the nanospheres were uniform with each average particle size of 504 nm, 456 nm and 240 nm.

Embodiment 32

Figure 32:
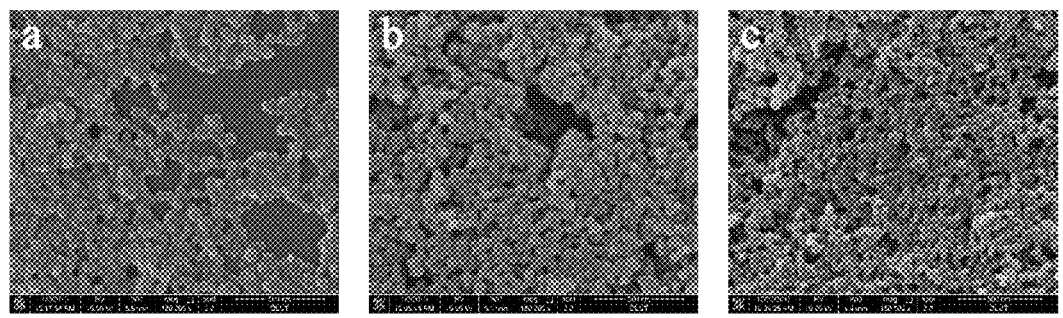
FIG. 32 is a SEM diagram of the nanospheres prepared by melamine and 2,4-diaminobenzenesulfonic acid involved reaction with different amounts of m-phenylenediamine.

0.126 g (0.001 mol) melamine, 0.252 g (0.0002 mol), 0.189 g(0.015 mol) and 0.126 g (0.001 mol) m-phenylenediamine, and 0.116 g(0.006 mol) 2,4-diaminobenzenesulfonic acid were dissolved in 50 mL water, 0.1 mL aqueous ammonia was dropwise added, and the solutions were stirred with the rotate speed of 500 rpm at the temperature of 25° C. until uniform and transparent; 2 mL methanal aqueous solution was added respectively, after about 2 seconds, the soltuions became turbid from clear; keeping the temperature, the solutions were stirred at 500 rpm for 2 hours. After the reactions were completed, the products were centrifuged, washed, and dried to obtain polymer nanospheres containing nitrogen and sulfur, and then observed by electron microscopy. As shown in FIG. 32, the amounts of m-phenylenediamine in FIG. 32a to FIG. 32e were 0.252 g (0.0002 mol), 0.189 g (0.015 mol) and 0.126 g (0.001 mol) successively, and the nanospheres were uniform with an average particle size of 62 nm, 56 nm and 47 nm respectively.

Embodiment 33

0.19 g (0.0015 mol) melamine and 0.0411 g (0.0003 mol) 2-aminophenylboronic acid were dissolved in 50 mL water, 0.1 mL aqueous ammonia was dropwise added, and the solution was stirred with the rotate speed of 500rpm at the temperature of 25° C. until uniform and transparent; 1.2 mL methanal aqueous solution was added, after about 4.25 minutes, the solution became turbid from clear; keeping 25° C., the solution was stirred at 500 rpm for 6 hours. After the reaction was completed, the product was centrifuged, washed, and dried to obtain polymer nanospheres containing nitrogen and sulfur.

Embodiment 34

0.19 g (0.0015 mol) melamine and 0.0411 g (0.0003 mol) 3-aminophenylboronic acid were dissolved in 50 mL water, 0.1 mL aqueous ammonia was dropwise added, and the solution was stirred with the rotate speed of 500rpm at the temperature of 25° C. until uniform and transparent; 1.2 mL methanal aqueous solution was added, after about 4.25 minutes, the solution became turbid from clear; keeping 25° C., the solution was stirred at 500 rpm for 6 hours. After the reaction was completed, the product was centrifuged, washed and dried to obtain polymer nanospheres containing nitrogen and sulfur.

Embodiment 35

0.19 g (0.0015 mol) melamine and 0.058 g (0.0003 mol) p-aminophenol phosphate monoester were dissolved in 50 mL water, 0.1 mL aqueous ammonia was dropwise added, and the solution was stirred with the rotate speed of 500 rpm at the temperature of 25° C. until uniform and transparent; 1.2 mL methanal aqueous solution was added, after about 7 minutes, the solutuion became turbid from clear; keeping 25° C., the solutions were stirred at 500 rpm for 6 hours. After the reaction was completed, the product was centrifuged, washed and dried to obtain polymer nanospheres containing nitrogen and sulfur.

Embodiment 36

0.19 g (0.0015 mol) melamine and 0.058 g (0.0003 mol) 2,4-diaminobenzene sulfonic acid were dissolved in 50 mL water, 0.1 mL aqueous ammonia was dropwise added, and the solution was stirred with the rotate speed of 500 rpm at the temperature of 25° C. until uniform and transparent; 1.1 mL malondialdehyde aqueous solution was added, after about 10 minutes, the solution became turbid from clear; keeping 25° C., the solution was stirred at 500 rpm for 4 hours. After the reaction was completed, the product was centrifuged, washed, and dried to obtain polymer nanospheres containing nitrogen and sulfur.

Embodiment 37

0.19 g (0.0015 mol) melamine and 0.058 g (0.0003 mol) 2,4-diaminobenzene sulfonic acid were dissolved in 50 mL water, 0.1 mL aqueous ammonia was dropwise added, and the solution was stirred with the rotate speed of 500 rpm at the temperature of 25° C. until uniform and transparent; 1.25 mL butanedial aqueous solution was added, after about 10 minutes, the solution became turbid from clear; keeping 25° C., the solution was stirred at 500 rpm for 4 hours. After the reaction was completed, the product was centrifuged, washed, and dried to obtain polymer nanospheres containing nitrogen and sulfur.

Embodiment 38

0.19 g (0.0015 mol) melamine and 0.058 g (0.0003 mol) 2,4-diaminobenzenesulfonic acid were dissolved in 50 mL water, 0.1 mL aqueous ammonia was dropwise added, and the solution was stirred with the rotate speed of 500 rpm at the temperature of 25° C. until uniform and transparent; 1.5 mL adipaldehyde aqueous solution was added, after about 10 minutes, the solution became turbid from clear; keeping 25° C., the solution was stirred at 500 rpm for 4 hours. After the reaction was completed, the product was centrifuged, washed, and dried to obtain polymer nanospheres containing nitrogen and sulfur.

Embodiment 39

Using the reaction of melamine, 2 4-diaminobenzenesulfonic acid and formaldehyde as an example:

The polymer nanospheres containing nitrogen and sulfur obtained after drying were roasted by using DTL 1200 tube furnace to conducted temperature programming; the temperature was raised to 100° C. at a rate of 2.5/min from the room temperature, and was kept constant for 30 minutes; then the temperature was raised to 300° C. at a rate of 2.5/min and was kept constant for 60 minutes; and then the temperature was raised to 500° C. at a rate of 2.5/min and was kept constant for 120 minutes. Finally, the carbonized nanospheres were obtained by natural cooling.

The calcination heating rate of other products was the same as 2.5/min; the temperature was kept at a constant temperature of 100° C. for 30 minutes, the temperature of the intermediate program was kept constant for 60 minutes, and the calcining temperature was kept for 120 minutes at last, and then naturally cooled.

Embodiment 40

Figure 33:
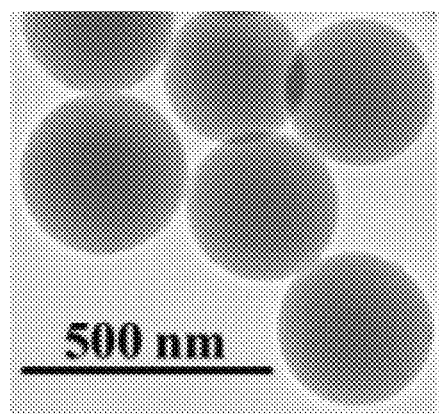
FIG. 33 is a STEM (Scanning transmission electron microscopy) diagram of the nanospheres obtained in Embodiment 39.
Figure 34:
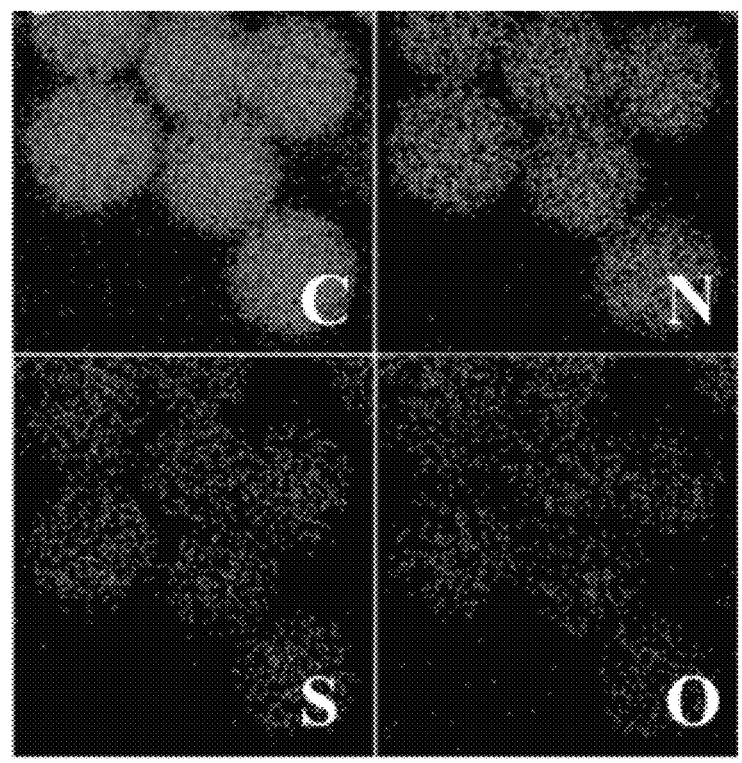
FIG. 34 is an element plane scanning diagram of the nanospheres obtained in Embodiment 39; wherein a, b, c, and d respectively correspond to the elements C, N, S, and O.
Figure 35:
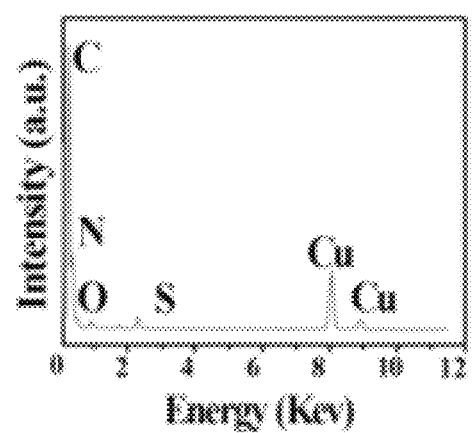
FIG. 35 is an X-ray energy spectrum analysis diagram of the nanospheres obtained in Embodiment 39.

The polymer nanospheres prepared by embodiment 39 were analyzed by scanning electron microscope, element plane scanning and X-ray energy spectrum. The results are shown in FIG. 33 (STEM diagram), FIG. 34 (elemental surface scanning diagram) and FIG. 35 (X-ray energy spectrum analysis diagram).

For those skilled in the art, without departing from the scope of technical solutions of the present disclosure, many possible variations and modifications may be made to the technical solutions of the present disclosure by using the technical contents disclosed above or equivalent embodiments may be made with equivalent changes. Therefore, any simple changes, equivalent changes and modifications of the above embodiments made according to the technical essence of the present disclosure without departing from the technical solutions of the present disclosure shall belong to the scope of protection of the present disclosure.

The invention claimed is:
1. A method for preparing heteroatom doped polymer nanospheres, comprising:
   (1) dissolving aromatic amine and a compound of formula I in water at 10-50° C. to obtain a first mixture, wherein the compound of formula I is

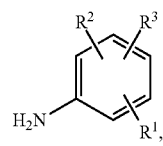

wherein:
$R^1$ is H or $NH_2$,
$R^2$ is selected from the group consisting of H, COOH, $SO_3H$, $B(OH)_2$, $OPO(OH)_2$, Cl, $OCH_3$, CN, OH, SH, and $NO_2$, and
$R^3$ is H or $SO_3H$;

(2) adding aqueous ammonia to the first mixture under stirring to obtain a second mixture;

(3) adding aldehyde to the second mixture and reacting under stirring to obtain a third mixture comprising polymer nanospheres, wherein the aromatic amine in step (1) is selected from the group consisting of melamine, 1,3-phenylenediamine, 1,4-phenylenediamine, 1,3-xylylenediamine, 1,4-xylylenediamine, tris(4-aminophenyl)amine, 2,4,6-triaminopyrimidine, 2,6-diaminopyridine, 1,5-diaminonaphthalene, 1,4-diaminonaphthalene, 2,3-diaminonaphthalene, 1,8-diaminonaphthalene, and mixtures thereof.

2. The method according to claim 1, wherein the compound of formula I in step (1) is selected from the group consisting of 2,4-diaminobenzenesulfonic acid, orthanilic acid, metanilic acid, sulfanilic acid, m-phenylenediaminodisulfonic acid, 3,5-diaminobenzoic acid, p-aminochlorobenzene, p-aminoanisole, p-aminobenzonitrile, p-aminophenol, o-aminobenzoic acid, m-aminobenzoic acid, p-aminobenzoic acid, aniline, o-phenylenediamine, m-phenylenediamine, p-phenylenediamine, p-aminothiophenol, p-nitroaniline, o-aminophenylboronic acid, m-aminophenylboronic acid, p-aminophenylboronic acid, and p-aminophenol phosphate monoester.

3. The method according to claim 1, wherein a concentration of the aromatic amine in step (1) is 0.015-1.0 mol/L.

4. The method according to claim 1, wherein a concentration of the compound of formula I is 0.015-0.2 mol/L.

5. The method according to claim 1, wherein the aldehyde in step (3) is selected from the group consisting of methanal, glyoxal, malondialdehyde, butanedial, glutaraldehyde, and adipaldehyde.

6. The method according to claim 1, wherein the aldehyde in step (3) is added dropwise to an amount of 5-12 times the equivalent of aromatic amines.

7. The method according to claim 1, wherein steps (1) to (3) are carried out at 20-35° C.

8. The method according to claim 1, wherein the aqueous ammonia in step (2) is added dropwise and stirred for 1-10 minutes.

9. The preparation method according to claim 1, wherein in step (3), the reacting under stirring is carried out for 0.2-6 hours.

10. The method according to claim 1, comprising: separating the polymer nanospheres from the third mixture by centrifuging, drying the polymer nanospheres, and roasting calcining the polymer nanospheres in an inert gas atmosphere to prepare heteroatom doped carbon nanospheres.

11. The method according to claim 10, wherein after reacting for 0.2-6 hours in step (3), centrifuging the third mixture at 600 rpm, and washing the polymer nanospheres three times with 20% ethanol solution.

12. The method according to claim 10, wherein the roasting calcination is carried out at 300-800° C.

* * * * *